(12) United States Patent
Chilese et al.

(10) Patent No.: US 9,422,978 B2
(45) Date of Patent: Aug. 23, 2016

(54) GAS BEARING ASSEMBLY FOR AN EUV LIGHT SOURCE

(71) Applicant: KLA-Tencor Corporation, Milpitas, CA (US)

(72) Inventors: Francis C. Chilese, San Ramon, CA (US); Rudy F. Garcia, Union City, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 133 days.

(21) Appl. No.: 14/310,632

(22) Filed: Jun. 20, 2014

(65) Prior Publication Data

US 2014/0376842 A1 Dec. 25, 2014

Related U.S. Application Data

(60) Provisional application No. 61/838,233, filed on Jun. 22, 2013.

(51) Int. Cl.
*F16C 32/06* (2006.01)
*F16J 15/40* (2006.01)
*F16C 33/74* (2006.01)

(52) U.S. Cl.
CPC .......... *F16C 32/0614* (2013.01); *F16C 32/0685* (2013.01); *F16C 33/748* (2013.01); *F16C 2380/18* (2013.01)

(58) Field of Classification Search
CPC ............... F16C 33/748; F16C 32/0685; F16C 2380/18; F16C 32/0614
USPC ........................ 384/109, 112, 120, 123, 134
See application file for complete search history.

(56) References Cited

U.S. PATENT DOCUMENTS

| | | | | |
|---|---|---|---|---|
| 2,501,304 A | * | 3/1950 | Baudry | F16J 15/40 184/6 |
| 3,124,979 A | * | 3/1964 | Macks | B23Q 1/38 173/148 |
| 4,349,244 A | * | 9/1982 | Hellriegel | G02B 7/02 359/826 |
| 4,726,689 A | | 2/1988 | Pollock | |
| 5,073,037 A | * | 12/1991 | Fujikawa | F16C 32/0614 384/107 |
| 6,134,981 A | | 10/2000 | Novak et al. | |
| 6,288,465 B1 | * | 9/2001 | Suzuki | F16C 32/00 219/648 |
| 6,353,271 B1 | | 3/2002 | Williams | |
| 6,373,156 B2 | * | 4/2002 | Suzuki | 310/68 B |

(Continued)

FOREIGN PATENT DOCUMENTS

| | | | | |
|---|---|---|---|---|
| EP | 0790641 A1 | | 8/1997 | |
| EP | 2441860 A1 | * | 4/2012 | ........ C23C 16/45519 |

(Continued)

*Primary Examiner* — Marcus Charles
(74) *Attorney, Agent, or Firm* — Simpson & Simpson, PLLC

(57) ABSTRACT

A gas bearing assembly including: a stator, a spindle rotatable about an axis, a first space between the spindle and the stator and arranged to receive a bearing gas at a first pressure, to support rotation of the spindle about the axis, a first annulus, in the stator or the spindle and arranged to vent the bearing gas from a first portion of the first space, a second annulus, in the stator or the spindle, and arranged to transport a barrier gas, at a second pressure, into a second portion of the first space, and a third annulus, in the stator or the spindle, the third annulus disposed between the first and second annuli and arranged to transport the bearing gas and the barrier gas out of a third portion of the space to a create, in the third portion, a third pressure less than the first and second pressures.

23 Claims, 4 Drawing Sheets

(56) References Cited

U.S. PATENT DOCUMENTS

| | | |
|---|---|---|
| 6,597,429 B2 | 7/2003 | Janssen et al. |
| 6,937,911 B2 | 8/2005 | Watson |
| 8,183,502 B2 | 5/2012 | Asakura et al. |
| 2002/0089657 A1 | 7/2002 | Okubo |
| 2002/0154839 A1 | 10/2002 | Trost |
| 2004/0109622 A1* | 6/2004 | Fujikawa ............ F16C 32/0614 384/107 |
| 2009/0032708 A1 | 2/2009 | Nakasuji et al. |
| 2009/0059190 A1* | 3/2009 | Tanaka .................. F16C 29/025 355/30 |
| 2010/0284638 A1* | 11/2010 | Hirata .................. F16C 32/067 384/100 |
| 2010/0323313 A1 | 12/2010 | Toriya et al. |
| 2012/0196050 A1* | 8/2012 | Vermeer ........... C23C 16/45551 427/535 |
| 2013/0264494 A1 | 10/2013 | Subrahmanyan et al. |

FOREIGN PATENT DOCUMENTS

| | | | |
|---|---|---|---|
| JP | 7030789 B | * | 4/1995 |
| JP | 2001074051 A | | 3/2001 |
| JP | 2009216200 A | * | 9/2009 |
| JP | 2013113429 A | | 6/2013 |
| WO | 99/20433 | | 4/1999 |

* cited by examiner

GAS BEARING ASSEMBLY FOR AN EUV LIGHT SOURCE

CROSS-REFERENCE TO RELATED APPLICATIONS

This application claims the benefit under 35 U.S.C. §119 (e) of U.S. Provisional Patent Application No. 61/838,233, filed Jun. 22, 2013, which application is incorporated herein by reference in its entirety.

TECHNICAL FIELD

The present disclosure relates to a gas bearing assembly for use with EUV light sources that is robust and relatively inexpensive and reduces contamination of a vacuum chamber in an EUV light source with the gas used in the gas bearing.

BACKGROUND

EUV light, which is defined as electromagnetic radiation with wavelengths between 124 nm and 10 nm, is used in next-generation photolithography systems to produce structures smaller than is possible with current ultra-violet light sources, such as excimer lasers. One method of creating EUV light involves spinning a cylinder with an external surface coated with a uniformly thick layer of solid xenon and hitting the xenon surface with a pulsed laser of sufficient intensity to create a plasma. Prior to the next pulse of light, the cylinder is rotated and/or translated to expose a fresh region of solid xenon. As the cylinder rotates, gaseous xenon is continuously sprayed onto the cold surface of the cylinder, reforming the frozen xenon surface over time. A particular spot or zone cannot be hit again until sufficient time has elapsed for the solid xenon surface to reform and return to its original condition. Adjacent spots must be separated by a minimum distance until the solid xenon is fully reformed to prevent damage to xenon ice, causing it to delaminate from the rotating cold cylinder.

As EUV light is strongly absorbed by many substances, the plasma is created in a vacuum chamber kept at a low ambient pressure by a vacuum pump. Outgassing of substances from the equipment within the vacuum chamber or other contamination of the vacuum chamber is undesirable, as it reduces the efficiency of the EUV light source by absorbing the EUV light as it is generated. Xenon and argon attenuate EUV light less than other substances at a given pressure, so if it necessary or unavoidable to have small amounts of some substance enter the vacuum chamber, these contaminants should be xenon or argon.

Due to the need to accurately target the solid xenon layer on the surface of the cylinder, the cylinder must be able to rotate with high precision and very low mechanical vibration levels and uncertainty of position. Additionally, the cylinder must be able to be filled with liquid nitrogen to reduce its temperature below the freezing point of xenon. Rotation bearings, preloaded mechanical ball bearings, and axial mechanical thrust bail bearings can be used to support rotation of the cylinder with ferrofluidic bearings used to effect a vacuum seal between the cylinder apparatus and the vacuum chamber. However, these mechanisms have certain disadvantages when used in an EUV light source, including creating unacceptably high numbers of particles through mechanical wear of the bearings, outgassing of lubricating substances into the vacuum chamber, and a tendency to cause significant vibrations and alignment stress to the rotating elements. Ferrofluidic bearings are complex, also prone to outgassing, and thus contamination of the vacuum chamber, and cause further mechanical alignment stress to the rotating elements.

Gas bearings have several advantages over mechanical bearings, as support essentially friction-free and contact-free rotation and axial motion, and they do not have the mechanical wear and lubrication outgassing problems of mechanical bearings. However, even with a gas bearing, the seal between the rotating spindle upon which the target cylinder is disposed and the stator body that supports the spindle is not perfect and the gas used in the gas bearing can enter the vacuum chamber, attenuating the EUV light as it is generated.

SUMMARY

According to aspects illustrated herein, there is provided a gas bearing assembly for an EUV light source, including: a stator body, a spindle rotatable about the stator body with respect to an axis of rotation, a first space between the spindle and the stator body and arranged to receive a bearing gas, at a first pressure, to support rotation of the spindle about the axis of rotation, a first annular groove, in the stator body or the spindle, in fluid communication with the space and arranged to vent the bearing gas from a first portion of the first space, a second annular groove, in the stator body or the spindle, in fluid communication with the space and arranged to transport a barrier gas, at a second pressure, into a second portion of the first space, and a third annular groove, in the stator body or the spindle, in fluid communication with the first space, the third annular groove disposed between the first and second annular grooves in an axial direction parallel to the axis of rotation, and arranged to transport the bearing gas and the barrier gas out of a third portion of the space to a create, in the third portion, a third pressure less than the first pressure and the second pressure.

According to aspects illustrated herein, there is provided a gas bearing assembly for an EUV light source, including: a stator body including a first annular groove, in fluid communication with a first portion of a space between the stator body and the spindle, and arranged to passively vent a bearing gas from the first portion, a second annular groove in fluid communication with a second portion of the space, and a third annular groove in fluid communication with a third portion of the space, the third annular groove disposed between the first and second annular grooves in an axial direction parallel to the axis of rotation, a spindle rotatable about the stator body with respect to an axis of rotation, a pump in communication with the second annular groove and arranged to inject a barrier gas into the second portion via the second annular groove, and a vacuum pump in fluid communication with the third annular groove and arranged to extract the bearing gas and the barrier gas from a third portion of the space to a create, in the third portion, a first pressure, wherein the bearing gas is injected into the first portion at a second pressure, greater than the first pressure, to support rotation of the spindle with respect to the stator body.

According to aspects illustrated herein, there is provided a method for operating a gas bearing assembly for an EUV light source, including: injecting a bearing gas at a first pressure into a first space between a spindle and a stator body, supporting, with the injected hearing gas, rotation the spindle with respect to the stator body, venting the bearing gas from a first portion of the first space through a first annular groove in the stator body or the spindle, injecting a barrier gas at a second pressure into a second portion of the first space via a second annular groove in the stator body or the spindle, extracting the bearing gas and the barrier gas from a third portion of the first space via a third annular groove, in the stator body or the spindle, the third annular groove disposed between the first and second annular grooves in an axial direction parallel to an axis of rotation of the spindle, and, creating, in the third portion, a third pressure less than the first pressure and the second pressure.

BRIEF DESCRIPTION OF THE DRAWINGS

Various embodiments are disclosed, by way of example only, with reference to the accompanying schematic drawing in which.

DETAILED DESCRIPTION

At the outset, it should be appreciated that like drawing numbers on different drawing views identify identical, or functionally similar, structural elements of the embodiments set forth herein. Additionally, it should be understood that the disclosure as claimed is not limited to the disclosed aspects.

Furthermore, it is understood that this patent is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
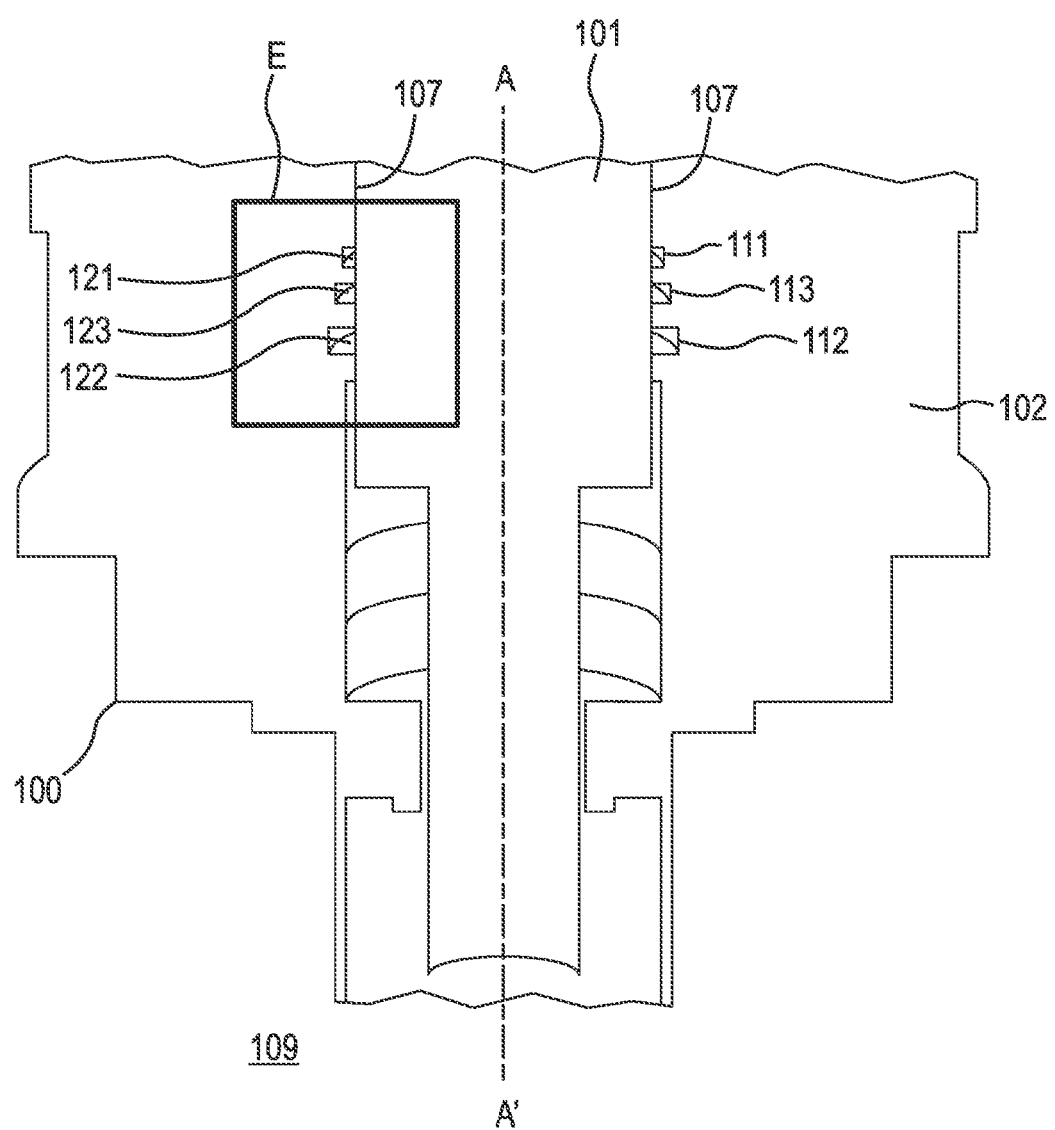
FIG. 1 is a cross-sectional view of a gas bearing assembly for an EUV light source.

FIG. 1 depicts a cross-sectional view of a gas bearing assembly 100 for an EUV light source including spindle 101 and stator body 102.

Figure 2:
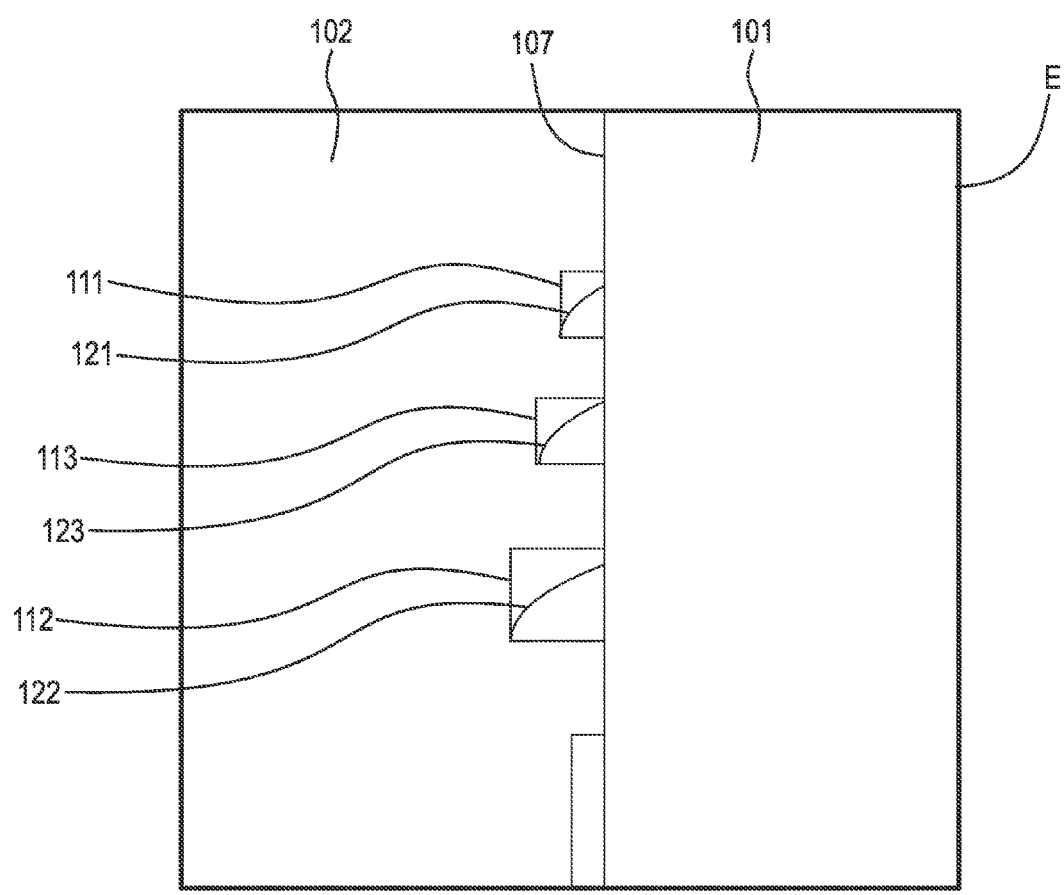
FIG. 2 is a magnified partial cross-section view of the gas bearing assembly for an EUV light source shown in FIG. 1 and defined by box E.

FIG. 2 is a magnified partial cross-section view of gas bearing assembly 100 for an EUV light source shown in FIG. 1 and defined by box E.

Figure 3:
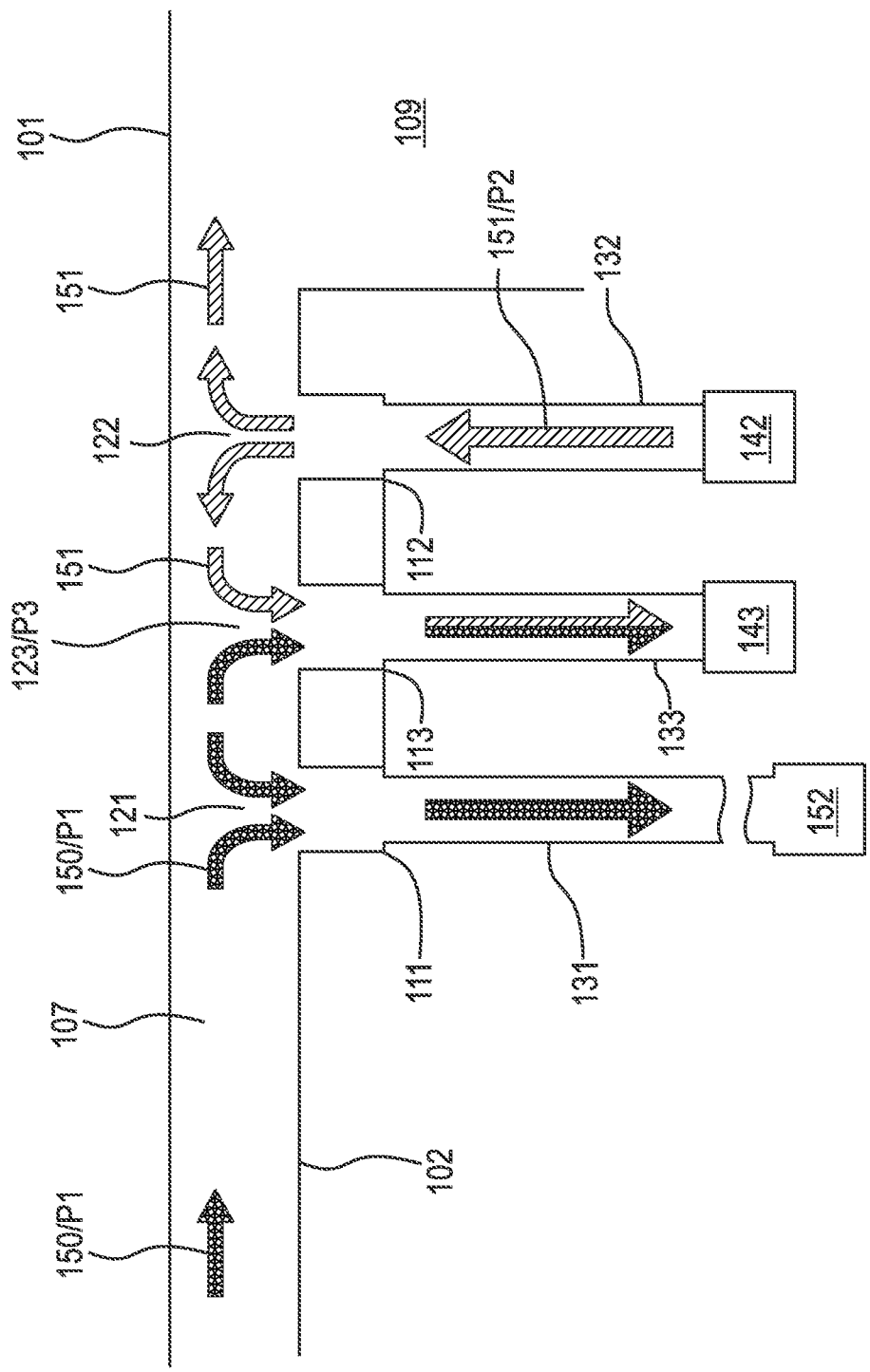
FIG. 3 is a schematic representation of a gas bearing assembly for an EUV light source; and, FIG. 4 is a cross-sectional view of a gas bearing assembly for an EUV light source.

FIG. 3 is a schematic representation of gas bearing assembly 100 for an EUV light source. The following should he viewed in light of FIGS. 1 through 3. Spindle 101 is rotatable around stator body 102 with respect to axis of rotation A-A'. Spindle 101 and stator body 102 are substantially parallel and cylindrical where both cylinders share axis of rotation A-A'. Space 107 is disposed between spindle 101 and stator body 102, which space takes the form of a thin cylindrical shell with axis of rotation A-A'. As such, space 107 is located between spindle 101 and stator body 102 in a radial direction orthogonal to axis of rotation A-A'. The radial extent space 107 as measured radially from axis of rotation A-A' is generally less than 10 μm, and due to the scale of FIG. 1, first space 107 is depicted in FIG. 1 as a single line. To clarify presentation, the radial extent of space 107 has been exaggerated in FIG. 3.

As further described below, space 107 is arranged to receive bearing gas flow 150 at pressure P1 to support rotation of spindle 101 about axis of rotation A-A'. The bearing gas may comprise nitrogen, oxygen, or purified air, such as atmospheric air that has been dehydrated and filtered. The bearing gas may also comprise argon or xenon.

Figure 4:
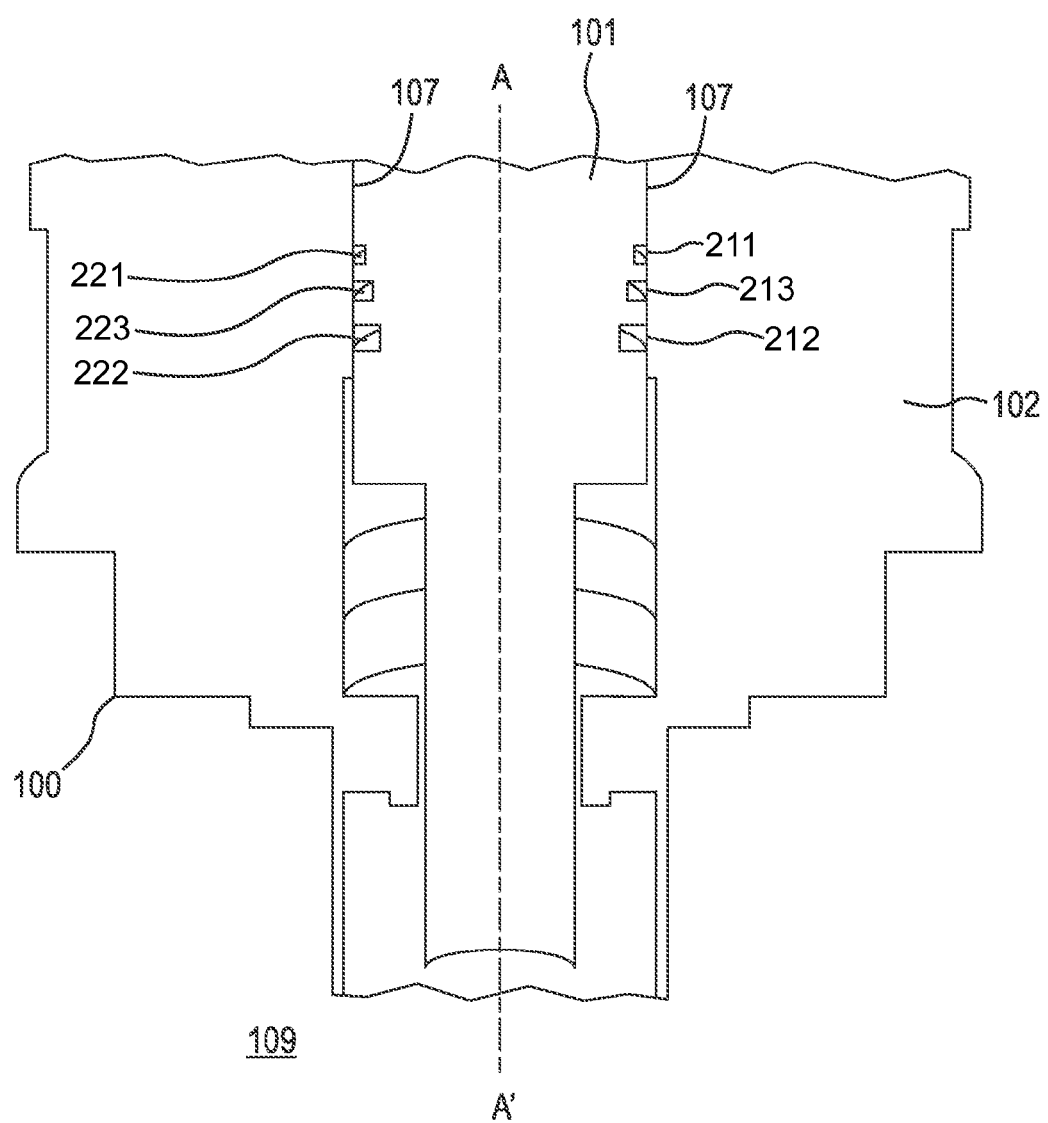

Annular groove 111 is arranged in stator body 102 or spindle 101 and is in fluid communication with space 107. As further described below, annular groove 111 is arranged to vent bearing gas flow 150 from portion 121 of space 107. Portion 121 is substantially the portion of space 107 radially aligned with annular groove 111. As shown in FIG. 4, annular groove 211 is arranged in spindle 101 and is in fluid communication with space 107. As further described below, annular groove 211 is arranged to a vent bearing gas flow from portion 221 of space 107. Portion 221 substantially the portion of space 107 radially aligned with annular groove 211.

Annular groove 112 is arranged in stator body 102 or spindle 101 and is in fluid communication with first space 107. As further described below, annular groove 112 is arranged to transport barrier gas flow 151, at pressure P2, into portion 122 of space 107. Portion 122 is defined as substantially the portion of space 107 radially aligned with annular groove 112. In an example embodiment, annular groove 112 is disposed proximate vacuum chamber 109 in an axial direction parallel to axis of rotation A-A'. As shown in FIG. 4, annular groove 212 is arranged in spindle 101 and is in fluid communication with first space 107. As further described below, annular groove 212 is arranged to transport a barrier gas flow, at a pressure, into portion 222 of space 107. Portion 222 is defined as substantially the portion of space 107 radially aligned with annular groove 112. In an example embodiment, annular groove 212 is disposed proximate vacuum chamber 109 in an axial direction parallel to axis of rotation A-A'. Barrier gas may comprise argon or xenon, and it is selected for acceptability in vacuum chamber 109. Argon and xenon attenuate EUV light less than other substances at a given pressure, so their presence in vacuum chamber 109 is not as detrimental as the presence of nitrogen, oxygen, or purified air. In an example embodiment, the barrier gas that is transported into portion 122 or portion 222 has a temperature substantially similar to the temperature of vacuum chamber 109.

Annular groove 113 is arranged in stator body 102 or spindle 101 and is in fluid communication with space 107. Annular groove 113 is disposed between annular groove 111 and annular groove 112 in an axial direction parallel to axis of rotation A-A'. As further described below, annular groove 113 is arranged to transport the bearing gas and the barrier gas out of portion 123 of space 107. Portion 123 of space 107 is defined as substantially the portion of space 107 radially aligned with annular groove 113. This transport of the bearing gas and the barrier gas out of portion 123 creates a pressure P3 in portion 123 that is less than the first pressure and the second pressure. As shown in FIG. 4, annular groove 213 is arranged in spindle 101 and is in fluid communication with space 107. Annular groove 213 is disposed between annular groove 211 and annular groove 212 in an axial direction parallel to axis of rotation A-A'. As further described below, annular groove 213 is arranged to transport the bearing gas and the barrier gas out of portion 223 of space 107. Portion 223 of space 107 is defined as substantially the portion of space 107 radially aligned with annular groove 213. This transport of the bearing gas and the barrier gas out of portion 223 creates a pressure in portion 223 that is less than the first pressure and the second pressure.

At pressure P1, the bearing gas exerts a force on both spindle 101 and stator body 102, such that neither spindle 101 and stator body 102 come in direct contact with each other, This force supports the rotation of spindle 101 with respect to stator body 102 around axis of rotation A-A'. In an example embodiment, spindle 101 can also move axially and radially with respect to stator body 102 relative to axis of rotation A-A'. In this way, the bearing gas in space 107 acts as a bearing, supporting the rotational, axial, and radial motion of spindle 102 and reducing the friction of such motion with respect to stator body 102.

In an example embodiment, pressure P1 is between 2-5 bar. Although bearing gas flow 150 is depicted by cross-hashed arrows in FIG. 3, it is not limited to the discrete paths represented by these cross-hashed arrows and is understood to be a continuous flow throughout space 107. Bearing gas is vented from portion 121. In an example embodiment, vent channel 131 is open to annular groove 111 and arranged to vent bearing gas from portion 121 of space 107. In an example embodiment, vent channel 131 is arranged to vent bearing gas to space 152, which is at a substantially ambient atmospheric pressure.

Although barrier gas flow 151 is depicted by diagonal-hashed arrows in FIG. 3, it is not limited to the discrete paths represented by these diagonal-hashed arrows and is understood to be a continuous flow throughout space 107. In an example embodiment, barrier gas is injected by pump 142 through barrier gas channel 132, which is open to pump 142 and annular groove 112. In this way, barrier gas is injected from pump 142 through barrier gas channel into portion 122 of space 107. In an example embodiment, the second pressure is approximately 1 bar.

Annular groove 113 is arranged to transport bearing gas and barrier gas out of portion 123 of space 107 at pressure P3, which is less than the pressure P1 and pressure P2. In an example embodiment, pressure P3 is approximately 0.1 bar. in an example embodiment, bearing gas and barrier gas are extracted by vacuum pump 143 through vacuum channel 133, which is open to vacuum pump 143 and annular groove 113. In this way, bearing gas and barrier gas are transported from portion 123 of first space 107 through vacuum channel 133, and are extracted by vacuum pump 143.

Pressure P3 is substantially lower than the predominant pressure P1 in space 107. This pressure differential transports the bearing gas that is not vented through first annular groove 111, through annular groove 113 and vacuum channel 133 where it is extracted by vacuum pump 143. Although this sequential transport of bearing gas from first space 107 greatly reduces the pressure of the bearing gas in the portion of first space 107 distal annular groove 113 relative to annular groove 111, some bearing gas will enter this distal portion. The barrier gas injected by puny 142 into barrier gas channel 132 and annular groove 112 creates a flow of barrier gas 151 towards annular groove 113, which directs the bearing gas not vented through annular groove 111 or extracted through annular groove 113 back towards annular groove 113 where it is extracted.

The sequential extraction and blocking of bearing gas provided by the three annular grooves substantially reduces the amount of bearing gas that enters vacuum chamber 109. In an example embodiment, some barrier gas will enter vacuum chamber 109, but barrier gas is selected for its acceptability in vacuum chamber 109, so the presence of a small amount of barrier gas in vacuum chamber 109 is not as detrimental to the generation of EUV light as would be the presence of typical bearing gasses.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A gas bearing assembly for an EUV light source, comprising:
    a stator body;
    a spindle rotatable about the stator body with respect to an axis of rotation;
    a first space between the spindle and the stator body and arranged to receive a bearing gas, at a first pressure, to support rotation of the spindle about the axis of rotation;
    a first annular groove, in the stator body or the spindle, in fluid communication with the space and arranged to vent the bearing gas from a first portion of the first space;
    a second annular groove, in the stator body or the spindle, in fluid communication with the space and arranged to transport a barrier gas, at a second pressure, into a second portion of the first space; and,
    a third annular groove, in the stator body or the spindle, in fluid communication with the first space, wherein the third annular groove is:
        disposed between the first and second annular grooves in an axial direction parallel to the axis of rotation; and,
        arranged to transport the bearing gas and the barrier gas out of a third portion of the space to a create, in the third portion, a third pressure less than the first pressure and the second pressure.

2. The gas bearing assembly recited in claim 1, wherein the first space is located between the spindle and the stator body in a radial direction orthogonal to the axis of rotation.

3. The gas bearing assembly recited in claim 1, further comprising a vent channel open to the first annular groove and arranged to vent the bearing gas from the first portion of the first space.

4. The gas bearing assembly recited in claim 3, further comprising:
    a second space at a substantially ambient atmospheric pressure, wherein the vent channel is arranged to vent the bearing gas to the second space.

5. The gas bearing assembly recited in claim 1, further comprising:
    A vacuum channel with a first end and a second end open to the third annular groove; and,
    a vacuum pump connected to the first end of the vacuum channel and arranged to extract the bearing gas and the barrier gas from the third portion of the first space.

6. The gas bearing assembly recited in claim 1, further comprising:
    A barrier gas channel with a first end and a second end open to the second annular groove; and,
    a pump connected to the first end of the barrier gas channel and arranged to pump the barrier gas into the second portion of the first space.

7. The gas bearing assembly recited in claim 1, wherein the first annular groove is arranged in the stator body.

8. The gas bearing assembly recited in claim 1, wherein the second annular groove is arranged in the stator body.

9. The gas bearing assembly recited in claim 1, wherein the third annular groove is arranged in the stator body.

10. The gas bearing assembly recited in claim 1, wherein the first annular groove is arranged in the spindle.

11. The gas bearing assembly recited in claim 1, wherein the second annular groove is arranged in the spindle.

12. The gas bearing assembly recited in claim 1, wherein the third annular groove is arranged in the spindle.

13. The gas bearing assembly recited in claim 1, wherein the bearing gas is selected from the group consisting of: nitrogen, oxygen, purified air, xenon, and argon.

14. The gas bearing assembly recited in claim 1, wherein the barrier gas is selected from the group consisting of: xenon and argon.

15. A gas bearing assembly for an EUV light source, comprising:
 a stator body including:
  a first annular groove:
   in fluid communication with a first portion of a space between the stator body and the spindle; and,
   arranged to passively vent a bearing gas from the first portion;
  a second annular groove in fluid communication with a second portion of the space; and,
  a third annular groove in fluid communication with a third portion of the space, wherein the third annular groove is disposed between the first and second annular grooves in an axial direction parallel to the axis of rotation;
 a spindle rotatable about the stator body with respect to an axis of rotation;
 a pump in communication with the second annular groove and arranged to inject a barrier gas into the second portion via the second annular groove; and,
 a vacuum pump in fluid communication with the third annular groove and arranged to extract the bearing gas and the barrier gas from a third portion of the space to a create, in the third portion, a first pressure, wherein:
  the bearing gas is injected into the first portion at a second pressure, greater than the first pressure, to support rotation of the spindle with respect to the stator body.

16. A method for operating a gas bearing assembly for an EUV light source, comprising:
 injecting a bearing gas at a first pressure into a first space between a spindle and a stator body;
 supporting, with the injected bearing gas, rotation the spindle with respect to the stator body;
 venting the bearing gas from a first portion of the first space through a first annular groove in the stator body or the spindle;
 injecting a barrier gas at a second pressure into a second portion of the first space via a second annular groove in the stator body or the spindle;
 extracting the bearing gas and the barrier gas from a third portion of the first space via a third annular groove, in the stator body or the spindle, wherein the third annular groove is disposed between the first and second annular grooves in an axial direction parallel to an axis of rotation of the spindle; and,
 creating, in the third portion, a third pressure less than the first pressure and the second pressure.

17. The method recited in claim 16, wherein venting the bearing gas from a first portion includes venting the bearing gas through a vent channel, in fluid communication with the first annular groove.

18. The method recited in claim 17, wherein venting the bearing gas through the vent channel includes venting the bearing gas to a second space at a substantially ambient atmospheric pressure.

19. The method recited in claim 16, further comprising:
 extracting, using a vacuum pump, the bearing gas and the barrier gas from the third portion through a channel with a first end connected to the vacuum pump and a second end open to the third annular groove.

20. The method recited in claim 16, further comprising:
 injecting, using a pump, the bearing gas to the second portion via a channel with a first end connected to the pump and a second end open to the second annular groove.

21. The method recited in claim 16, wherein the first pressure is greater than the second pressure.

22. The method recited in claim 16, wherein the bearing gas is selected from the group consisting of: nitrogen, oxygen, purified air, xenon, and argon.

23. The method recited in claim 16, wherein the barrier gas is selected from the group consisting of: xenon and argon.

* * * * *